(12) United States Patent
Tan et al.

(10) Patent No.: US 8,781,660 B2
(45) Date of Patent: Jul. 15, 2014

(54) TIERED, SUBTRACTIVE METHOD TO SOLVE A LINEAR CONSTRAINT FUNCTION ASSOCIATED WITH CONTROLLING A HYBRID POWERTRAIN SYSTEM

(75) Inventors: Honghao Tan, Ann Arbor, MI (US); Anthony H. Heap, Ann Arbor, MI (US); Sean W. McGrogan, Ann Arbor, MI (US); Brian R. Medema, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 13/444,773

(22) Filed: Apr. 11, 2012

(65) Prior Publication Data

US 2013/0274967 A1    Oct. 17, 2013

(51) Int. Cl.
*B60L 9/00* (2006.01)
(52) U.S. Cl.
USPC ............................ 701/22; 701/51; 180/65.265

(58) Field of Classification Search
USPC .............. 701/22, 51, 54; 180/65.265, 65.285, 180/65.8, 65.29, 65.24, 65.21
See application file for complete search history.

(56) References Cited

U.S. PATENT DOCUMENTS 7,200,476 B2 *    4/2007   Cawthorne et al. ............. 701/51

\* cited by examiner

*Primary Examiner* — Thomas Black
*Assistant Examiner* — Luke Huynh

(57) ABSTRACT

A method for controlling a hybrid powertrain system includes employing a system constraints function to identify a feasible solution for an objective variable that satisfies a plurality of independent and dependent constraints for an objective function. The objective variable is associated with a parameter of the hybrid powertrain system. Upon determining that the system constraints function fails to provide a feasible solution for the objective variable that satisfies all of the independent and dependent constraints, a problem recomposition scheme is executed to remove all of the dependent constraints and then reapply and adjust selected ones of the dependent constraints to obtain a feasible solution for the system constraints function that achieves a preferred state for the objective variable.

14 Claims, 5 Drawing Sheets

TIERED, SUBTRACTIVE METHOD TO SOLVE A LINEAR CONSTRAINT FUNCTION ASSOCIATED WITH CONTROLLING A HYBRID POWERTRAIN SYSTEM

TECHNICAL FIELD

This disclosure is related to control systems for hybrid powertrain systems.

BACKGROUND

The statements in this section merely provide background information related to the present disclosure. Accordingly, such statements are not intended to constitute an admission of prior art.

Known vehicle systems use hybrid powertrain architectures to generate tractive torque using plural torque-generative devices including internal combustion engines and one or more non-hydrocarbon-fueled torque machines, which may include electric machines that transform electric power to mechanical torque. Hybrid powertrain architectures may be configured to transfer tractive torque to an output member through a transmission device. Known hybrid powertrain architectures include series-hybrid configurations, parallel-hybrid configurations, and compound-split hybrid configurations. Electric machines operative as motors and generators are controlled to generate torque inputs to the transmission independently of a torque input from the internal combustion engine. The electric machines may react and transform vehicle kinetic energy transmitted through the vehicle driveline to electrical energy that is storable in an electrical energy storage device employing regenerative braking and other methods. A control system monitors various inputs from the vehicle and the operator and provides operational control of the powertrain, including controlling transmission operating range state and gear shifting, controlling operation of the engine and the torque machines, and regulating the electrical power interchange among the electrical energy storage device and the electric machines to manage torque and rotational speed outputs of the transmission.

Components employed in hybrid powertrain systems have operating limits that are determined based upon a physical capacity to perform an intended function, including, e.g., transferring torque, transferring electric power, or storing electric energy. Service life of a component may be reduced if a respective operating limit is violated. Operating limits include electric motor speed limits, engine speed limits, pinion gear speed limits of planetary gear sets, and battery power limits. Operating limits further include motor torque limits, engine torque limits, clutch torque limits, and belt torque limits. Operating limits also include electric limits including voltage and current limits. By way of example, service life of a high-voltage battery may be limited if either over-voltage or under-voltage limits are exceeded. Similarly, a service life of a switch in an electric inverter may be limited if an operating temperature is exceeded. Similarly, service life of a hydraulically activated clutch may be limited if an operating pressure is exceeded.

Control systems for hybrid powertrain systems impose system constraints based upon the operating limits to determine control parameters for operation during ongoing operation.

SUMMARY

A method for controlling a hybrid powertrain system includes employing a system constraints function to identify a feasible solution for an objective variable that satisfies a plurality of independent and dependent constraints for an objective function. The objective variable is associated with a parameter of the hybrid powertrain system. Upon determining that the system constraints function fails to provide a feasible solution for the objective variable that satisfies all of the independent and dependent constraints, a problem recomposition scheme is executed to remove all of the dependent constraints and then reapply and adjust selected ones of the dependent constraints to obtain a feasible solution for the system constraints function that achieves a preferred state for the objective variable.

BRIEF DESCRIPTION OF THE DRAWINGS

One or more embodiments will now be described, by way of example, with reference to the accompanying drawings, in which.

DETAILED DESCRIPTION

Figure 1:
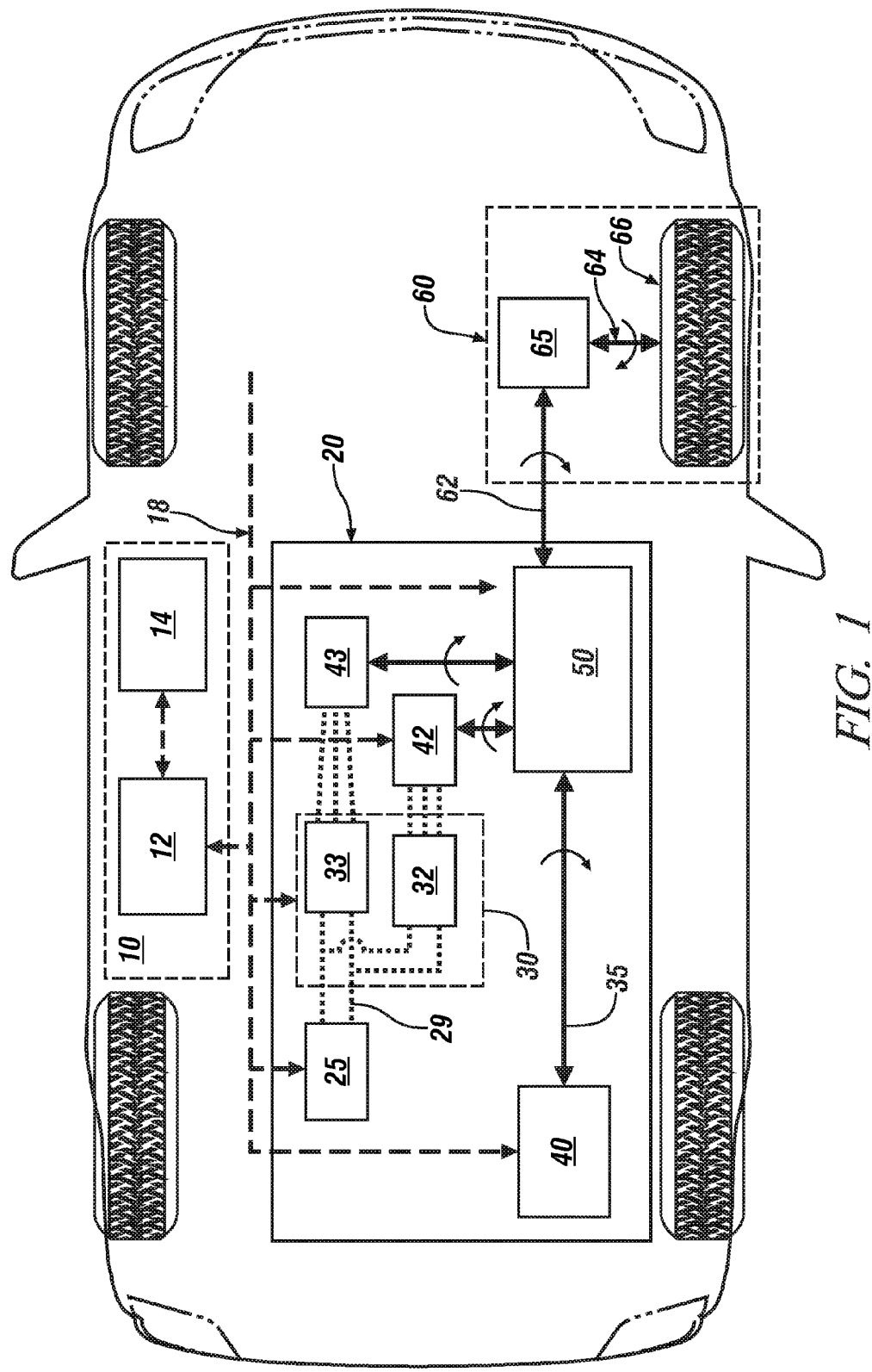
FIG. 1 illustrates a diagram of a vehicle including a hybrid powertrain system having an engine, hybrid transmission, torque machines, and a driveline in accordance with the present disclosure.

Referring now to the drawings, wherein the showings are for the purpose of illustrating certain exemplary embodiments only and not for the purpose of limiting the same, FIG. 1 schematically shows a vehicle including a hybrid powertrain system 20 coupled to a driveline 60 and controlled by a control system 10. The hybrid powertrain system 20 is a non-limiting embodiment of a hybrid powertrain system that employs multiple torque-generative devices including an internal combustion engine and one or more torque machines to generate tractive torque. Other suitable hybrid powertrain systems may be configured to generate tractive torque under specific conditions as described herein with similar effect. By way of example, the torque machine(s) may include electromechanical torque machines, hydraulic-mechanical torque machines, pneumatic-mechanical torque machines, and others. The hybrid powertrain system 20 may be configured to operate in one of multiple tractive torque generative modes wherein only a non-internal combustion engine torque machine is employed to generate tractive torque, referred to herein as an electric vehicle (EV) traction mode.

The hybrid powertrain system 20 described herein includes a mechanical power path that includes engine 40 and first and second electrically-powered torque machines 42 and 43, respectively, that mechanically couple to a hybrid transmission 50 having an output member 62 that couples to the driveline 60. A high-voltage electrical circuit 30 electrically connects to a high-voltage battery 25 via a high-voltage bus 29. The high-voltage electrical circuit 30 includes first and second electric power inverters 32 and 33, respectively that electrically connect to the first and second torque machines 42 and 43, respectively. A second electrical circuit may provide an electrical connection between the high-voltage battery 25 and a remote stationary charging system.

The engine 40 may be any suitable internal combustion engine, and is preferably a multi-cylinder direct fuel injection internal combustion engine that converts fuel to mechanical power through a combustion process. The engine 40 is configured to execute autostart and autostop control schemes and fuel cutoff (FCO) control schemes during ongoing operation of the hybrid powertrain system 20. The engine 40 is considered to be in an ON state when it is being fueled and is rotating and generating torque, and is considered to be in the OFF state when it is not being fueled and is not rotating. The engine 40 is considered to be in the FCO state when it is rotating but is not being fueled. The engine 40 is considered to be in the idle state when it is fueled and firing, but is generating a minimal amount of torque. The engine 40 may be started to generate tractive torque transferable to the driveline 60 and/or to provide power to the first torque machine 42 to generate energy that may be stored or used by the second torque machine 43 to generate tractive torque.

The first and second torque machines 42 and 43 may be any suitable devices configured to convert stored energy to mechanical power, and include multi-phase electric motor/generators in one embodiment. The multi-phase electric motor/generators are configured to convert stored electric energy to mechanical power when operating in a torque generating state and convert mechanical power to electric energy that can be stored in the high-voltage battery 25 when operating in an electric power generating state. The hybrid transmission 50 may be any suitable torque transmission device, and in one embodiment includes one or more differential gear sets and torque-transfer clutches and brakes to effect torque transfer over a range of speeds between the engine 40, the first and second torque machines 42 and 43, and the output member 62 that couples to the vehicle driveline 60. The hybrid transmission 50 is preferably configured to operate in fixed-gear and continuously variable operating range states by selectively activating the torque-transfer clutches. Thus, the powertrain system 20 is configured to operate in a plurality of tractive torque generative modes that include fixed-gear and continuously variable operating range states with the engine 40 in one of the ON state, the OFF state, and the FCO state.

The driveline 60 includes a differential gear device 65 that mechanically couples to an axle 64 or half-shaft that mechanically couples to a wheel 66 in one embodiment. The differential gear device 65 is coupled to the output member 62 of the hybrid powertrain system 20, and transfers output power therebetween. The driveline 60 transfers tractive power between the hybrid transmission 50 and a road surface. Mechanical power originating in the engine 40 may be transferred via an input member 35 to the first torque machine 42 and to the output member 62 via the hybrid transmission 50. Mechanical power originating in the first torque machine 42 may be transferred to the engine 40 via the input member 35 and to the output member 62 via the hybrid transmission 50. Mechanical power originating in the second torque machine 43 may be transferred via the hybrid transmission 50 to the output member 62. Mechanical power can be transferred between the hybrid transmission 50 and the driveline 60 via the output member 62. Other powertrain system configurations may be employed to similar effect.

The high-voltage battery 25 stores potential electric energy and is electrically connected via the high-voltage bus 29 to the high-voltage electrical circuit 30 that connects to the first and second torque machines 42 and 43 to transfer electric power therebetween. It is appreciated that the high-voltage battery 25 is an electric energy storage device that can include a plurality of electrical cells, ultracapacitors, and other devices configured to store electric energy on-vehicle. One exemplary high-voltage battery 25 includes a plurality of lithium-ion cells. Parametric states associated with the high-voltage battery 25 include a state-of-charge (SOC), temperature, available voltage, and available battery power, each of which is monitored by the control system 10.

The high-voltage electrical circuit 30 includes first and second inverters 32 and 33 that electrically connect to the first and second torque machines 42 and 43, respectively. The first and second torque machines 42 and 43 interact with the respective first and second inverters 32 and 33 to convert stored electric energy to mechanical power and convert mechanical power to electric energy that can be stored in the high-voltage battery 25. The first and second electric power inverters 32 and 33 are operative to transform high voltage DC electric power to high-voltage AC electric power and are also operative to transform high voltage AC electric power to high-voltage DC electric power. Electric power originating in the first torque machine 42 may be transferred electrically to the high-voltage battery 25 via the high-voltage electrical circuit 30 and the high-voltage bus 29 and to the second torque machine 43 via the high-voltage electrical circuit 30. Electric power originating in the second torque machine 43 may be transferred electrically to the high-voltage battery 25 via the high-voltage electrical circuit 30 and the high-voltage bus 29 and to the first torque machine 42 via the high-voltage electrical circuit 30.

The control system 10 includes a control module 12 that is configured to control operation of the vehicle including the hybrid powertrain system 20 in response to operator inputs detected via an operator interface 14. The operator interface 14 captures and conveys information from a plurality of human/machine interface devices through which the vehicle operator commands operation of the vehicle, including, e.g., an ignition switch to enable an operator to crank and start the engine 40, an accelerator pedal, a brake pedal, and a transmission range selector (PRNDL). Although the control module 12 and operator interface 14 are shown as individual discrete elements, such an illustration is for ease of description and is non-limiting. It is appreciated that information transfer to and from the control module 12 can be accomplished using one or more communications paths, e.g., communications bus 18, which can include one or more of a direct connection, a local area network bus, and a serial peripheral interface bus. The control module 12 signally and operatively connects to individual elements of the hybrid powertrain system 20 directly or via one or more communications buses, shown herein as communications bus 18. The control module 12 signally connects to the sensing devices of each of the high-voltage battery 25, the high-voltage bus 29, the first and second electric power inverters 32 and 33, the first and second torque machines 42 and 43, the engine 40, and the hybrid transmission 50 to monitor operation and determine parametric states thereof. The control module 12 operatively connects to the actuators of the first and second inverters 32 and 33, the engine 40, and the hybrid transmission 50 to control operation thereof in accordance with executed control schemes that are stored in the form of algorithms and calibrations. It is appreciated that each of the first and second inverters 32 and 33 transforms electric power in a manner suitable for generating torque by employing one or both the first and second torque machines 42 and 43, and transforms mechanical power in a manner suitable for generating electric power by employing one or both the first and second torque machines 42 and 43, depending upon torque inputs and operating conditions.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The control module 12 executes control schemes to control operation of the engine 40 in coordination with the first and second electric power inverters 32 and 33 to control overall operation of the hybrid powertrain system 20 to manage transfer of mechanical power to the driveline 60 and to manage electric power flow to the high-voltage battery 25. Such control schemes include balancing operation of the engine 40 with allowable battery power limits associated with the high-voltage battery 25 while achieving an output torque transferable to the driveline 60 that is responsive to an operator torque request as limited by torque and speed constraints.

A system constraints control scheme employs a system constraints function to determine the effect of component limits of a hybrid powertrain system on a selected objective variable. This is preferably determined periodically during ongoing operation. The system constraints function is a multi-dimensional function that represents simultaneously-solved governing equations describing movements of the transmission components and considers parameters such as torques, speeds, moments of inertia, spin losses and others, and is shown as follows.

$$\begin{bmatrix} Y_1 \\ Y_2 \\ Y_3 \\ Y_4 \end{bmatrix} = [A1] \begin{bmatrix} X_1 \\ X_2 \\ X_3 \end{bmatrix} + [A2] \quad [1]$$

As is appreciated, the scalar terms of A1 and A2 are system-dependent. The scalar term A1 is a 4×3 matrix of scalar values and the scalar term A2 is a 4×1 matrix of scalar values. The system constraints function (EQ. 1) is subjected to minimum and maximum constraints associated with dependent variables (i.e., Y1, Y2, Y3, Y4) and independent variables (i.e., X1, X2, X3), which are represented as follows.

Y2_Min≤Y2≤Y2_Max

Y3_Min≤Y3≤Y3_Max

Y4_Min≤Y4≤Y4_Max

X1_Min≤X1≤X1_Max

X2_Min≤X2≤X2_Max

X3_Min≤X3≤X3_Max [2]

Exemplary system constraints include engine torque, motor torques, transmission input torque, transmission output torque, clutch reactive torques, speeds and accelerations of transmission elements, among others.

There are preferably plural system constraints functions that are based upon torque transfer or rotational speeds of transmission elements and developed for controlling and managing operation of a hybrid powertrain system. Each system constraints function has a specific mapping of virtual variables (e.g., Y1, Y2, Y3, Y4) to physical parameters that vary during powertrain operation. The varying physical parameters for a selected system constraints function include torque parameters of the hybrid powertrain system, e.g., engine torque, motor torques, clutch reactive torques, and output torque. The varying physical parameters for a selected system constraints function may instead include speed parameters of the hybrid powertrain system, e.g., engine speed, motor speeds, clutch slip speeds, and output speed. The system constraints function (EQ. 1) is illustrative. Other multi-dimensional system constraints functions that are developed for and are descriptive of other hybrid powertrain systems may be employed with similar effect.

The system constraints function (EQ. 1) includes the variable Y1, which is referred to as an objective variable, and represents the parameter for which the system constraints function (EQ. 1) is being solved, either as a maximum value or as a minimum value, taking into account the minimum and maximum constraints (EQ. 2). Each of the remaining dependent variables Y2, Y3, Y4 and the independent variables X1, X2, X3 are subjected to the aforementioned minimum and maximum constraint values. The dependent variables Y2, Y3, Y4 and the independent variables X1, X2, X3 may include either selected speeds or selected torque values. With reference to the hybrid powertrain system 20 depicted in FIG. 1, the selected speeds may include a transmission input speed to the hybrid transmission 50, motor speeds of the first and second torque machines 42 and 43, an output speed of the hybrid transmission 50, and other relevant speeds. With reference to the hybrid powertrain system 20 depicted in FIG. 1, the selected torques may include a transmission input torque to the hybrid transmission 50, motor torques of the first and second torque machines 42 and 43, an output torque of the hybrid transmission 50, clutch reactive torques and other relevant torques. One or more of the independent variables may be subjected to non-linear constraints, such as constraints associated with battery power.

In operation, the system constraints function (EQ. 1) is employed to identify a minimum or maximum value for the objective variable Y1 that satisfies all of the constraints of the dependent variables Y2, Y3, Y4 and the independent variables X1, X2, X3. As described and detailed herein, the battery power limits Pbat, i.e., Pbat_Max and Pbat_Min, are presumed to be infinite.

Figure 2:
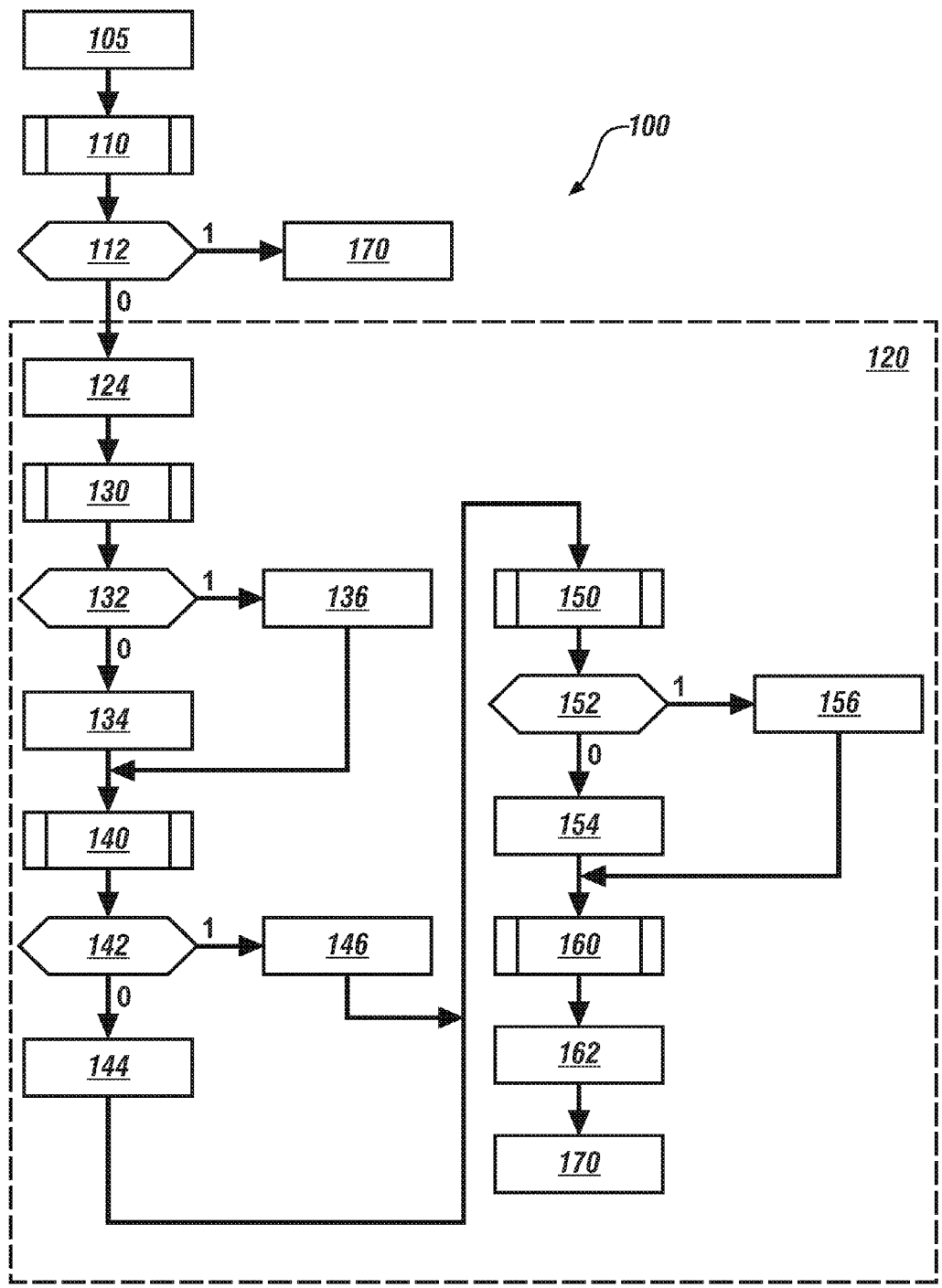
FIG. 2 illustrates a system constraints scheme 100 including a problem recomposition scheme 120 to identify a minimum or maximum value for an objective variable Y1 in accordance with the disclosure.

FIG. 2 schematically shows an embodiment of a system constraints scheme 100 including a problem recomposition scheme 120 to identify a minimum or maximum value for the objective variable Y1. The problem recomposition scheme 120 is executed upon determining that the system constraints function provides no solution for the objective variable Y1 that satisfies all of the constraints for the dependent variables and the independent variables. The problem recomposition scheme 120 is a tiered, subtractive scheme employing a predetermined priority structure that removes all of the constraints associated with the dependent variables, and then reapplies and adjusts the constraints of the dependent variables in a blockwise manner. The system constraints function is iteratively solved to obtain a feasible solution that includes a preferred value for the objective variable Y1, i.e., either a maximum or minimum value that satisfies the constraints for the independent variables and satisfies all of the adjusted constraints for the dependent variables. Operation of the problem recomposition scheme 120 includes initially removing all of the dependent constraints and solving the system constraints function (EQ. 1) in view of the applied constraints (Blocks 120, 124). The dependent constraints are then individually reapplied in a blockwise manner to adjust the applied dependent constraint to achieve the preferred state for the objective variable, and to determine a feasible solution for the system constraints function that achieves the preferred state for the objective variable in view of the independent constraints and the adjusted dependent constraints (Blocks 130-162). Table 1 is provided as a key to FIG. 2 wherein the numerically labeled blocks and the corresponding functions are set forth as follows.

TABLE 1

| BLOCK | BLOCK CONTENTS |
|---|---|
| 100 | System Constraints Scheme |
| 105 | Monitor and determine constraints associated with Y2, Y3, Y4 and X1, X2, X3 |
| 110 | Execute Solver (Y1: X1, X2, X3, Y2, Y3, Y4) |
| 112 | Feasible solution for Y1_Max found? |
| 120 | Problem Recomposition Scheme |

TABLE 1-continued

| BLOCK | BLOCK CONTENTS |
|---|---|
| 124 | Adjust constraints to include only variables associated with physical parameters X1, X2, X3 |
| 130 | Execute Solver (Y1: X1, X2, X3, Y2) |
| 132 | Feasible solution for Y1_Max found? |
| 134 | Adjust Y2 limits to determine Y2* |
| 136 | Y2* = Y2_Min, Y2_Max |
| 140 | Execute Solver (Y1: X1, X2, X3, Y2*, Y3) |
| 142 | Feasible solution for Y1_Max found? |
| 144 | Adjust Y3 limits to determine Y3* |
| 146 | Y3* = Y3_Min, Y3_Max |
| 150 | Execute Solver (Y1: X1, X2, X3, Y2*, Y3*, Y4) |
| 152 | Feasible solution for Y1_Max found? |
| 154 | Adjust Y4 limits to determine Y4* |
| 156 | Y4* = Y4_Min, Y4_Max |
| 160 | Execute Solver (Y1: X1, X2, X3, Y2*, Y3*, Y4*) |
| 162 | Determine Y1_Max |
| 170 | Execute control of powertrain system using Y1_Max |

The system constraints scheme 100 is periodically executed during ongoing operation of the vehicle. Operation of the vehicle including the hybrid powertrain system 20 is monitored to determine constraints associated with the dependent variables (i.e., Y2, Y3, Y4) and the independent variables (i.e., X1, X2, X3) as previously described (105), and a solver function is executed. The solver function, expressed herein as Solver (Y1: Y2, . . . Yn, X1 . . . Xm), employs suitable linear programming methods, e.g., simplex methodology, on the system constraints function (EQ. 1) in view of the minimum and maximum constraints (EQ. 2) to generate a solution that includes extrema, i.e., a minimum or maximum state for the objective variable Y1 that satisfies all of the aforementioned constraints (110). This is expressed as follows.

$$\text{Solver}(Y1:X1,X2,X3,Y2,Y3,Y4) \quad [3]$$

The use of linear programming, e.g., the simplex method to generate a solution that includes Y1 extrema, i.e., minimum and maximum states for the objective variable Y1 is known to those having ordinary skill in the art.

If a feasible solution can be determined that satisfies all of the constraints (112)(1), execution of the present iteration of the constraints control scheme is complete, and the determined minimum or maximum state for the objective variable Y1 (Y1_Max) is employed to control operation of the hybrid powertrain system (170). A feasible solution is a set of control parameters for controlling the hybrid powertrain system that includes a solution having coordinates of (X1, X2, X3) that satisfies all of the constraints Y2, Y3, Y4, X1, X2, and X3 for the objective variable Y1. A feasible solution may include (X1, X2, X3)=(0, 0, 0). A feasible set is a collection of all of the feasible points (X1, X2, X3).

Alternatively, the problem recomposition scheme 120 is executed when there is no feasible solution for the objective variable Y1 that satisfies all of the constraints of the dependent variables Y2, Y3, Y4, and the independent variables X1, X2, X3 even when the battery power limits Pbat, i.e., Pbat_Max and Pbat_Min are presumed to be infinite (112)(0).

The problem recomposition scheme 120 is a tiered, subtractive scheme employing a strict priority structure to apply and adjust the constraints of the dependent variables Y2, Y3, Y4, and the independent variables X1, X2, X3 to obtain an executable solution for the system constraints function (EQ. 1). The problem recomposition scheme 120 systematically applies and adjusts the constraints associated with selected dependent variables Y2, Y3, Y4, and the independent variables X1, X2, X3 and executes the solver function to identify a feasible solution for system constraints function (EQ. 1) that can be executed to operate the hybrid powertrain system 20. This action includes progressively adjusting values of selected individual constraints as needed and executing the solver function to identify a feasible solution for system constraints function (EQ. 1).

The problem recomposition scheme 120 initially includes removing the constraints on the dependent variables Y2, Y3, Y4 (124) and executing the solver function to identify extrema, i.e., minimum and maximum states for the objective variable Y1 that satisfy all of the constraints of the independent variables X1, X2, X3, which are those variables associated with physical parameters of the powertrain system. This is expressed as follows.

$$\text{Solver}(Y1:X1,X2,X3) \qquad [4]$$

Figure 3:
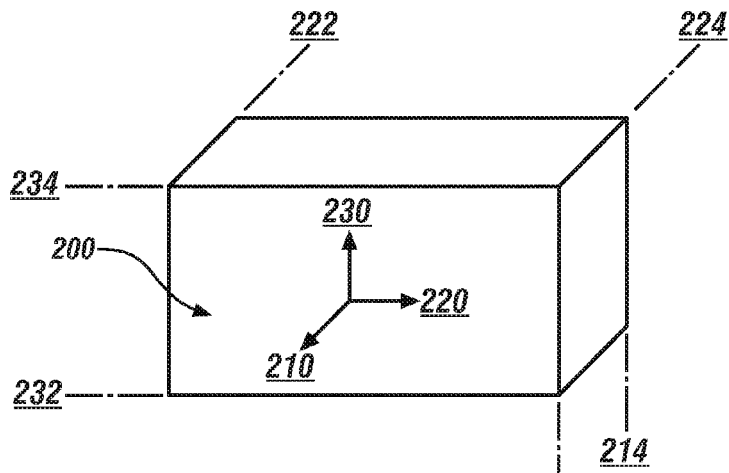
FIG. 3 illustrates an embodiment of a rectangular prism in three-dimensional space and depicts a solution space for the objective variable Y1 circumscribed by the limits of independent variables in accordance with the disclosure.

The solution to this solver function includes Y1 extrema, i.e., the minimum and maximum states for the objective variable Y1 that satisfy all of the constraints of the independent variables X1, X2, X3. As is appreciated, when the independent variables X1, X2, X3 form the only constraints, there is at least one feasible solution available. The feasible solution set for the independent variables X1, X2, X3 may be illustrated as a rectangular prism 200. FIG. 3 graphically illustrates an embodiment of the rectangular prism 200 in three-dimensional space (X1/X2/X3) including axes of X1 210, X2 220, and X3 230. The solution space for the objective variable Y1 is a rectangular prism 200 that is circumscribed by the limits X1_Min 212, X1_Max 214, X2_Min 222, X2_Max 224, X3_Min 232, and X3_Max 234.

The problem recomposition scheme 120 next executes the solver function on the system constraints function (EQ. 1) to generate a solution that satisfies all of the constraints of the independent variables X1, X2, X3 while introducing limits on a first of the dependent variables, which is Y2 in this embodiment (130). This is expressed as follows.

$$\text{Solver}(Y1:X1,X2,X3,Y2) \qquad [5]$$

Figure 4:
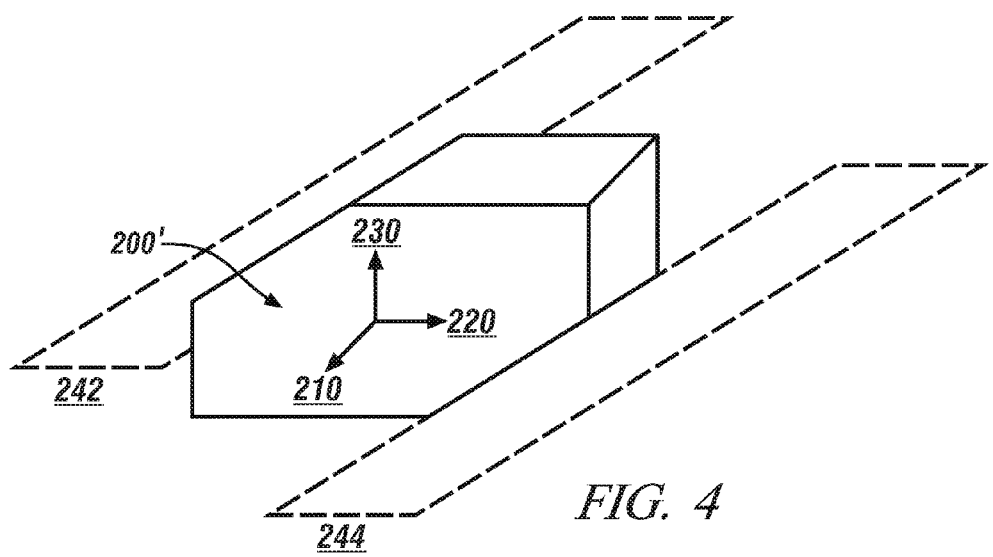
FIG. 4 illustrates an embodiment of a rectangular prism in three-dimensional space and depicts a solution space for the objective variable Y1 circumscribed by the limits of the independent variables with Y2 constraints superimposed thereon in accordance with the disclosure.

The solution to this solver function includes Y1 extrema, i.e., the minimum and maximum states for the objective variable Y1 that satisfy all of the constraints of X1, X2, X3 and the Y2 constraints. As previously described, Pbat is presumed to be met. FIG. 4 graphically illustrates a solution space for the objective variable Y1 in the form of a polyhedron 200', which is the rectangular prism 200 shown with reference to FIG. 3 circumscribed by the Y2 constraints including Y2_Min 242 and Y2_Max 244, portrayed as planar elements in three-dimensional space. FIG. 4 includes the axes of X1 210, X2 220, and X3 230, with Y2 constraints superimposed thereon. If a feasible solution can be determined that satisfies all of the aforementioned constraints (132)(1), the Y2 limits (Y2*) are set equal to the Y2 constraints including Y2_Min 242 and Y2_Max 244 (136).

When no feasible solution that satisfies all of the aforementioned constraints can be determined (132)(0), the Y2 limits are adjusted to new limits (Y2*), which are imposed upon the solver function (134). When required, this includes solving the optimization problem to minimize and maximize Y2, subject to the higher priority constraints, i.e., the independent variables X1, X2, X3. The optimization problem is expressed as follows.

$$\text{Solver}(Y2:X1,X2,X3) \qquad [6]$$

A more complete description of adjusting limits to new limits is provided hereinbelow with reference to the Y4 constraints.

Figure 5:
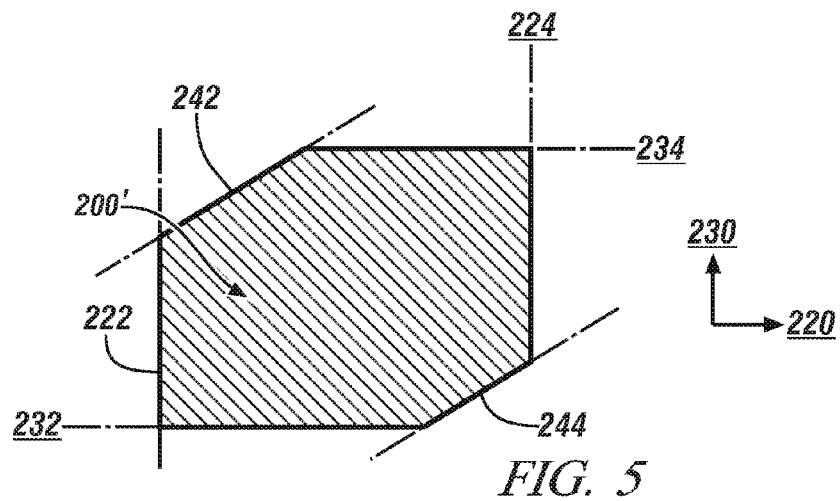
FIG. 5 illustrates a portion of a rectangular prism in two-dimensional space and depicts a solution space for the objective variable Y1 circumscribed by the limits of the independent variables with Y2 constraints superimposed thereon in accordance with the disclosure.

FIG. 5 graphically illustrates a portion of the polyhedron 200' in two-dimensional X2/X3 space including axes of X2 220 and X3 230. The illustrated solution space displays the solution space for a known value of X1 for ease of illustrating. FIG. 5 shows the solution space for X1=constant (where X1Min<=const<=X1Max). The solution space for the objective variable Y1 is a portion of the polyhedron 200' as circumscribed by the limits X1_Min 212, X1_Max 214, X2_Min 222, X2_Max 224, X3_Min 232, X3_Max 234, and the adjusted Y2 limits (Y2*) including Y2_Min 242 and Y2_Max 244, which are portrayed as linear elements in two-dimensional space. As shown, the adjusted Y2 Limits (Y2*) are set equal to the Y2 constraints, since in this example, the set of constraints (X1, X2, X3, Y2) yielded a feasible solution.

The problem recomposition scheme 120 next executes the solver function on the system constraints function (EQ. 1) to generate a solution that satisfies all of the constraints of the independent variables X1, X2, X3 and Y2* while introducing limits on a third of the dependent variables, which is Y3 in this embodiment (140). This is expressed as follows.

$$\text{Solver}(Y1:X1,X2,X3,Y2*,Y3) \qquad [7]$$

The solution to this solver function includes Y1 extrema, i.e., the minimum and maximum states for the objective variable Y1 that satisfy all of the constraints of X1, X2, X3, and Y2* and satisfies the Y3 constraints. As previously described, Pbat is presumed to be met.

If a feasible solution can be determined that satisfies all of the aforementioned constraints (142)(1), the Y3 limits (Y3*) are set equal to the Y3 constraints including Y3_Min 252 and Y3_Max 254 (146).

Figure 6:
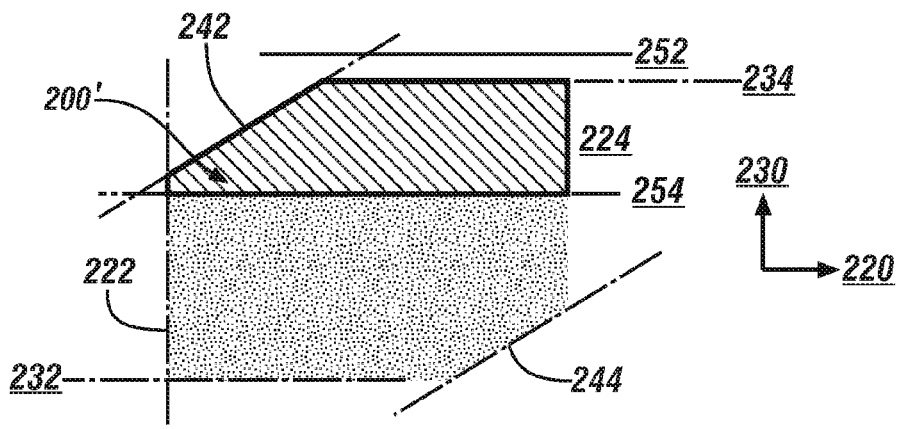
FIG. 6 illustrates a portion of a rectangular prism in two-dimensional space and depicts a solution space for the objective variable Y1 circumscribed by the limits of the independent variables and the Y2 constraints with Y3 constraints superimposed thereon in accordance with the disclosure.

FIG. 6 graphically illustrates a portion of the polyhedron 200' in two-dimensional X2/X3 space including axes of X2 220 and X3 230. The solution space for the objective variable Y1 is the polyhedron 200' as circumscribed by the limits X1_Min 212, X1_Max 214, X2_Min 222, X2_Max 224, X3_Min 232, X3_Max 234, and the Y2limits (Y2*) Y2_Min 242 and Y2_Max 244, and further circumscribed by the imposed Y3 limits (Y3*) Y3_Min 252 and Y3_Max 254, which are portrayed as linear elements in two-dimensional space. As shown, the Y3 limits (Y3*) are adjusted to be equal to the Y3 constraints.

When no feasible solution that satisfies all of the aforementioned constraints can be determined (142)(0), the Y3 constraints are adjusted to new Y3 limits (Y3*), which are imposed upon the solver function (144). When required, this includes solving the optimization problem to minimize and maximize Y3, subject to the higher priority constraints, i.e., the independent variables X1, X2, X3, Y2. The optimization problem is expressed as follows.

$$\text{Solver}(Y3:X1,X2,X3,Y2*) \qquad [8]$$

A more complete description of adjusting the limits to new limits is provided hereinbelow with reference to the Y4 constraints.

The problem recomposition scheme 120 next executes the solver function on the system constraints function (EQ. 1) to generate a solution that satisfies all of the constraints of X1, X2, X3, Y2* and Y3*, while introducing limits on a fourth of the dependent variables, which is Y4 in this embodiment (150). This is expressed as follows.

$$\text{Solver}(Y1:X1,X2,X3,Y2*,Y3*,Y4) \qquad [9]$$

The solution to this solver function includes Y1 extrema, i.e., the minimum and maximum states for the objective variable Y1 that satisfy all of the constraints of the independent variables X1, X2, X3, Y2*, and Y3*, and satisfies the Y4 constraints. As previously described, Pbat is presumed to be met.

If a feasible solution can be determined that satisfies all of the aforementioned constraints (152)(1), the Y4 limits (Y4*) are set equal to the Y4 constraints including Y4_Min 262 and Y4_Max 264 (156).

When no feasible solution that satisfies all of the aforementioned constraints can be determined (152)(0), the Y4 limits are adjusted to new limits (Y4*), which are imposed upon the solver function (154).

The problem recomposition scheme 120 next executes the solver function on the system constraints function (EQ. 1) to generate a solution that satisfies all of the constraints of X1, X2, X3, Y2*, Y3*, and Y4* (160). This is expressed as follows.

$$\text{Solver}(Y1:X1,X2,X3,Y2*,Y3*,Y4*) \quad [10]$$

A feasible solution that satisfies all of the aforementioned constraints is determined (162), and execution of the present iteration of the constraints control scheme 100 and the problem recomposition scheme 120 is complete. The determined minimum or maximum state for the objective variable Y1 (Y1_Min or Y1_Max) is employed to control operation of the hybrid powertrain system (170).

Figure 7:
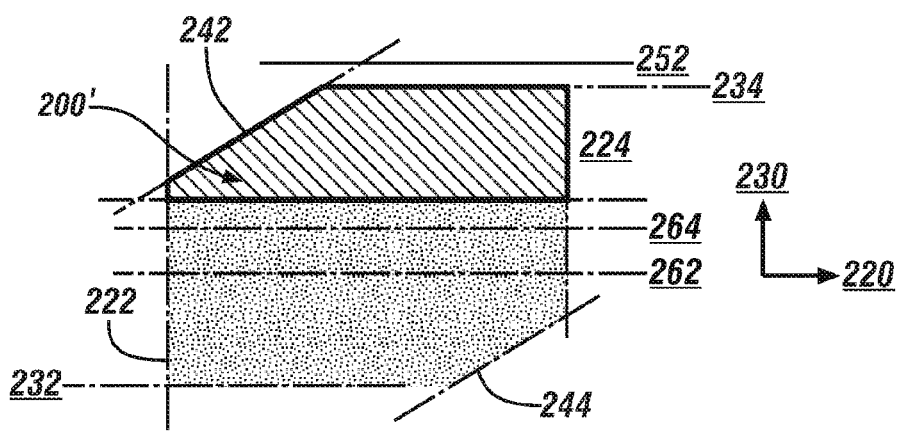
FIG. 7 illustrates a portion of a rectangular prism in two-dimensional space and depicts a solution space for the objective variable Y1 circumscribed by the limits of the independent variables and the Y2 and Y3 constraints with Y4 constraints superimposed thereon and having no presently feasible solution in accordance with the disclosure.

FIG. 7 graphically illustrates a portion of the polyhedron 200' in two-dimensional X2/X3 space including axes of X2 220 and X3 230. The solution space for the objective variable Y1 is the polyhedron 200' circumscribed by the limits X1_Min 212, X1_Max 214, X2_Min 222, X2_Max 224, X3_Min 232, X3_Max 234, the Y2 constraints Y2_Min 242 and Y2_Max 244, and the Y3 limits Y3_Min 252 and Y3_Max 254. As shown, the solution space for the objective variable Y1 that satisfies the Y3 limits Y3_Min 252 and Y3_Max 254 and also satisfies the Y4 limits Y4_Min 262 and Y4_Max 264 is empty. Thus, there is no feasible solution when the solver function is executed to identify a solution that includes Y1 extrema, i.e., the minimum and maximum states for the objective variable Y1.

Each execution of the system constraints scheme 100 is compelled to return a solution that includes one of the Y1 extrema, i.e., the minimum and maximum states for the objective variable Y1, even if the feasible set corresponding to the system of constraints is empty. It can be inferred from the result shown in FIG. 7 that a solution must include violating one of the previously established limits, i.e., one of the X1, X2, X3, Y2 or Y3 limits, or violating the newly added Y4 limits.

The newly added Y4 limits are adjusted to new limits (Y4*) that are being imposed upon the solver function (154). This includes solving the optimization problem to minimize and maximize Y4, subject to the higher priority constraints, i.e., the independent variables X1, X2, X3 and the dependent variables Y2 and Y3. The optimization problem is expressed as follows.

$$\text{Solver}(Y4:X1,X2,X3,Y2*,Y3*) \quad [11]$$

A feasible solution that satisfies all of the aforementioned constraints is determined, represented as Y4_Min^ and Y4_Max^. The Y4 limits are adjusted to Y4_Min^ and Y4_Max^ for the upcoming blocks. The Y4 limits (Y4*) are constrained to the adjusted Y4 limits Y4_Min^ 272 and Y4_Max^ 274 as follows.

$$Y4\_Min* = \min(\max(Y4Min, Y4Min\char`^), Y4Max\char`^) \quad [12]$$

$$Y4\_Max* = \max(\min(Y4Max, Y4Max\char`^), Y4Min\char`^) \quad [13]$$

Figure 8:
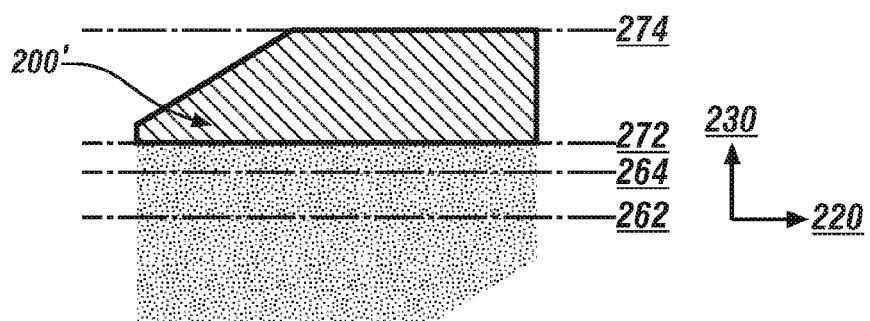
FIG. 8 illustrates a portion of a rectangular prism in two-dimensional space and depicts a solution space for the objective variable Y1 circumscribed by the limits of the independent variables and the Y2 and Y3 constraints with adjusted Y4 constraints superimposed thereon in accordance with the disclosure.

The adjusted set of Y4 limits, referred to as Y4_Min^ 272 and Y4_Max^ 274 are shown with reference to FIG. 8. The adjusted Y4 limits Y4_Min^ 272 and Y4_Max^ 274 represent the least and greatest values for Y4 that can be achieved with the feasible set previously defined. It is known that there is no intersection between (Y4_Min, Y4_Max) and (Y4_Min^, Y4_Max^). Thus, Y4_Min* equals Y4_Max*.

Figure 9:
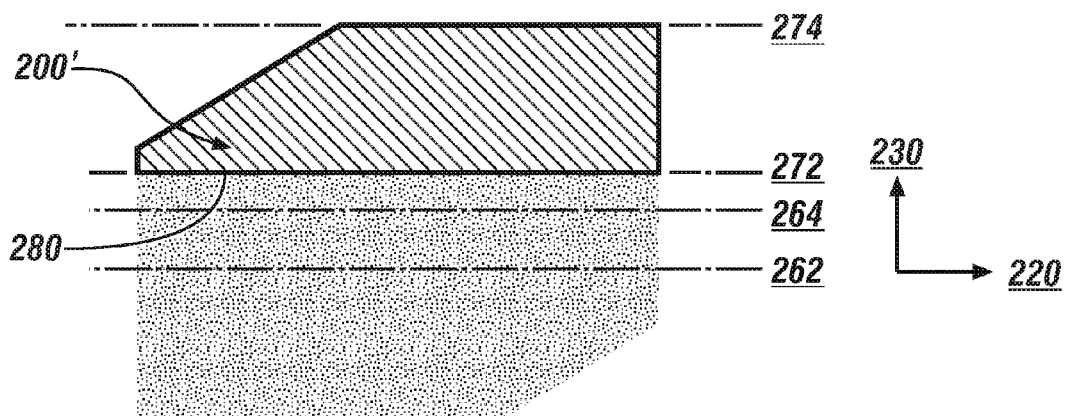
FIG. 9 illustrates a portion of a rectangular prism in two-dimensional space and depicts a solution space for the objective variable Y1 circumscribed by the limits of the independent variables and the Y2 and Y3 constraints with adjusted Y4 constraints superimposed thereon and including a feasible solution in accordance with the disclosure.

FIG. 9 graphically illustrates a portion of the polyhedron 200' in two-dimensional X2/X3 space including axes of X2 220 and X3 230. The solution space for the objective variable Y1 is the polyhedron 200' circumscribed by the limits X1_Min 212, X1_Max 214, X2_Min 222, X2_Max 224, X3_Min 232, X3_Max 234, the Y2 constraints_Min 242 and Y2_Max 244, and the imposed Y3 limits Y3_Min 252 and Y3_Max 254 (omitted for clarity) and the Y4 limits constrained to the adjusted Y4 limits Y4_Min^ 272 and Y4_Max^ 274. A feasible solution that satisfies all of the constraints of the independent variables X1, X2, X3, the Y2 limits (Y2*), the Y3 limits (Y3*), and the adjusted Y4 limits (Y4*) is as follows.

$$\text{Solver}(Y1:X1,X2,X3,Y2*,Y3*,Y4*) \quad [14]$$

The feasible solution is represented as a line segment 280, which represents the Y4 limits (Y4*). When the feasible solution is a line segment, it indicates there are an infinite number of seemingly co-equal solutions that minimize the violation of the Y4 constraint. However, the objective variable Y1 is not necessarily also a constant value over the range of the feasible solution. Thus, the control scheme executes the solver function to solve the system constraints function (EQ. 1) and identify a minimum or maximum value for the objective variable Y1 that satisfies all of the constraints of the dependent variables Y2*, Y3*, Y4*, and the independent variables X1, X2, X3.

Figure 10:
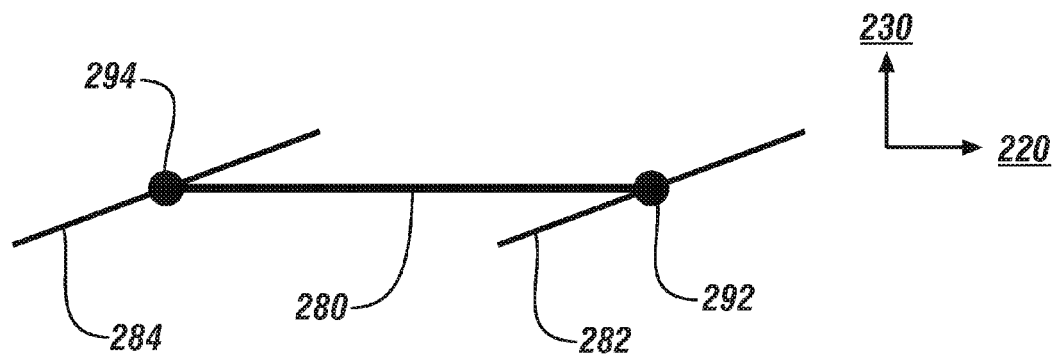
FIG. 10 illustrates a portion of a rectangular prism in two-dimensional space and depicts a solution space for the objective variable Y1 circumscribed by the limits of the independent variables and the Y2 and Y3 constraints with adjusted Y4 constraints superimposed thereon and including a feasible solution including minimum and maximum states for the objective variable Y1 in accordance with the disclosure.

FIG. 10 graphically illustrates the feasible solution represented as line 280, which is the portion of the polyhedron 200' depicted in FIG. 9. The objective variable Y1 is depicted and includes a minimum state for Y1 282 to a maximum state for Y1 284, each which is represented as a line. Thus, problem recomposition scheme 120 executes the solver function depicted in EQ. 14 to identify the preferred feasible solution for the objective variable Y1 that is one of the extrema, i.e., one of Y1_max and Y1_min that achieves the aforementioned constraints. These are depicted as a minimum solution 292 and a maximum solution 294.

The problem recomposition scheme 120 prioritizes the constraints as X1, X2, X3, Y2, Y3, and Y4, from greater priority to lesser priority. The order of applying the constraints of Y2, Y3, and Y4 is specifically defined and dictates the priority of the constraints, and is not arbitrary. Each time a new constraint is applied, the problem recomposition scheme 120 adjusts the magnitude of the added constraint until a non-empty feasible solution is achieved.

The constraints of Y2, Y3, and Y4 are ranked in order of importance. Thus, a constraint imposing a restriction based upon driveability, e.g., output torque, has a lower priority than a constraint based upon clutch torque or motor torque. Satisfying motor torque limits is more important than achieving the output torque in response to an operator torque request because an electric motor cannot deliver more torque than its capacity, whereas failing to achieve output torque affects driveability and operator expectations. Satisfying clutch torque limits is more important because violating a clutch torque limit may result in clutch slip, which affects service life of the clutch as well as driveability.

The execution of the problem recomposition scheme 120 with the ranking and ordered application of the constraints avoids or minimizes the likelihood of torque discontinuities that can occur in dealing with problems that yield an empty feasible set.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a hybrid powertrain system, comprising:
    employing, in a controller, a system constraints function to identify a feasible solution for an objective variable that satisfies a plurality of independent and dependent constraints for an objective function, the objective variable associated with a parameter of the hybrid powertrain system; and
    upon determining that the system constraints function fails to provide a feasible solution for the objective variable that satisfies all of the independent and dependent constraints, executing a problem recomposition scheme to remove all of the dependent constraints and then reapply and adjust selected ones of the dependent constraints to obtain a feasible solution for the system constraints function that achieves a preferred state for the objective variable;
    wherein the preferred state for the objective variable comprises one of a minimum and a maximum state for the objective variable; and
    wherein the system constraints function comprises a plurality of simultaneously solved governing equations defining relationships between variables that are mapped to parameters associated with operating the hybrid powertrain system.

2. The method of claim 1, wherein executing the problem recomposition scheme to remove all of the dependent constraints and then reapply and adjust selected ones of the dependent constraints to obtain the feasible solution for the system constraints function that achieves the preferred state for the objective variable comprises:
    individually reapplying the dependent constraints in a blockwise manner including adjusting the reapplied dependent constraint; and
    determining the feasible solution for the system constraints function that achieves the preferred state for the objective variable in view of the independent constraints and the adjusted reapplied dependent constraints.

3. The method of claim 2, wherein individually reapplying the dependent constraints in a blockwise manner comprises employing a predetermined priority structure for the blockwise reapplication of the dependent constraints, including reapplying and adjusting the dependent constraint having a highest priority first and reapplying and adjusting the dependent constraint having a lowest priority last.

4. The method of claim 1, wherein the parameters associated with operating the hybrid powertrain system comprise torque parameters.

5. The method of claim 1, wherein the parameters associated with operating the hybrid powertrain system comprise rotational speed parameters.

6. The method of claim 1, wherein employing the system constraints function to identify the feasible solution for the objective variable that satisfies the plurality of independent and dependent constraints for the objective function comprises employing linear programming to identify the feasible solution for the objective variable.

7. The method of claim 6, wherein the feasible solution satisfies minimum and maximum constraints for the objective function.

8. The method of claim 1, wherein executing the problem recomposition scheme to remove all of the dependent constraints and then reapply and adjust selected ones of the dependent constraints to obtain the feasible solution for the system constraints function that achieves the preferred state for the objective variable comprises employing linear programming on the system constraints function to satisfy the independent constraints and the reapplied adjusted dependent constraints to obtain the feasible solution for the system constraints function that achieves the preferred state for the objective variable.

9. Method for controlling a hybrid powertrain system, comprising:
    upon determining that a system constraints function is unable to provide a feasible solution for an objective function comprising an objective variable associated with a parameter of the hybrid powertrain system that satisfies all of a plurality of independent and dependent constraints on the objective function, executing, in a controller, a problem recomposition scheme to remove all of the dependent constraints and then reapply and adjust selected ones of the dependent constraints to obtain a feasible solution for the system constraints function that achieves a preferred state for the objective variable;
    wherein executing the problem recomposition scheme comprises:
        individually reapplying the dependent constraints in a blockwise manner including adjusting the reapplied dependent constraint; and
        determining the feasible solution for the system constraints function that achieves the preferred state for the objective variable in view of the independent constraints and the adjusted reapplied dependent constraints.

10. The method of claim 9, wherein executing the problem recomposition scheme to remove all of the dependent constraints and then reapply and adjust selected ones of the dependent constraints to obtain the feasible solution for the system constraints function that achieves the preferred state for the objective variable comprises employing linear programming on the system constraints function to satisfy the independent constraints and the reapplied adjusted dependent constraints to obtain the feasible solution for the system constraints function that achieves the preferred state for the objective variable.

11. The method of claim 9, wherein the preferred state for the objective variable comprises one of a minimum and a maximum state for the objective variable.

12. The method of claim 9, wherein the system constraints function comprises a plurality of simultaneously solved governing equations defining relationships between variables that are mapped to parameters associated with operating the hybrid powertrain system.

13. The method of claim 9, wherein individually reapplying the dependent constraints in a blockwise manner including adjusting the applied dependent constraint comprises employing a predetermined priority structure for the blockwise reapplication of the dependent constraints, including reapplying and adjusting the dependent constraint having a highest priority first and reapplying and adjusting the dependent constraint having a lowest priority last.

14. Method for controlling a hybrid powertrain system, comprising removing all of a plurality of dependent constraints and then reapplying and adjusting selected ones of the dependent constraints to obtain a feasible solution for a system constraints function that achieves a preferred state for an objective variable including executing in a controller the system constraints function comprising a plurality of simultaneously solved governing equations defining relationships between variables that are mapped to parameters associated with operating the hybrid powertrain system.

\* \* \* \* \*